(12) United States Patent
Ng et al.

(10) Patent No.: US 10,009,321 B2
(45) Date of Patent: Jun. 26, 2018

(54) METHOD PERFORMED BY AT LEAST ONE SERVER FOR PROCESSING A DATA PACKET FROM A FIRST COMPUTING DEVICE TO A SECOND COMPUTING DEVICE TO PERMIT END-TO-END ENCRYPTION COMMUNICATION

(71) Applicant: TreeBox Solutions Pte Ltd, Singapore (SG)

(72) Inventors: Li Huang Ng, Singapore (SG); Chee Wah Chong, Singapore (SG); Ngai Kain Yip, Singapore (SG); Hon Tat Lau, Singapore (SG); Wendy Siew Yen Chan, Singapore (SG); Tse Chin Teo, Singapore (SG)

(73) Assignee: TreeBox Solutions Pte Ltd, Singapore (SG)

( * ) Notice: Subject to any disclaimer, the term of this patent is extended or adjusted under 35 U.S.C. 154(b) by 0 days. days.

(21) Appl. No.: 14/786,526

(22) PCT Filed: Apr. 23, 2014

(86) PCT No.: PCT/SG2014/000181
§ 371 (c)(1),
(2) Date: Oct. 22, 2015

(87) PCT Pub. No.: WO2014/175830
PCT Pub. Date: Oct. 30, 2014

(65) Prior Publication Data
US 2016/0134594 A1    May 12, 2016

(30) Foreign Application Priority Data
Apr. 25, 2013   (SG) ............................... 201303260-2

(51) Int. Cl.
*H04L 29/06*     (2006.01)
*H04L 9/08*     (2006.01)
(Continued)

(52) U.S. Cl.
CPC ........ *H04L 63/0428* (2013.01); *H04L 9/0819* (2013.01); *H04L 9/14* (2013.01);
(Continued)

(58) Field of Classification Search
CPC ........................... H04L 63/0428; H04L 63/04
(Continued)

(56) References Cited

U.S. PATENT DOCUMENTS

| 5,751,813 | A | * | 5/1998 | Dorenbos | ........... H04L 63/0442 380/270 |
| 6,304,659 | B1 | | 10/2001 | Gold et al. | |

(Continued)

FOREIGN PATENT DOCUMENTS

| JP | H10126406 A | 5/1998 |
| JP | H11112491 A | 4/1999 |

(Continued)

OTHER PUBLICATIONS

International Preliminary Report on Patentability (dated Mar. 10, 2015); International Search Report and Written Opinion of the ISA (dated Jul. 8, 2014).
(Continued)

*Primary Examiner* — Dant B Shaifer Harriman
(74) *Attorney, Agent, or Firm* — Joseph Chu; JCIP

(57) ABSTRACT

A method (500) performed by at least one server for processing a data packet from a first computing device to be transmitted to a second computing device is disclosed, in which the data packet includes a message encrypted using a first encryption key to form an encrypted message, identification data of the second computing device encrypted
(Continued)

using a second encryption key to form encrypted identification data, and encrypted first and second encryption keys. The method comprises decrypting (504) the encrypted second encryption key; decrypting (506) the encrypted identification data using the decrypted second encryption key; and transmitting (508) the data packet based on the decrypted identification data, wherein the encrypted message and first encryption key are arranged to be undecryptable by the server to permit end-to-end encryption communication between the first and second computing devices. A related system is also disclosed.

9 Claims, 6 Drawing Sheets

(51) Int. Cl.
*H04W 12/00* (2009.01)
*H04L 9/14* (2006.01)

(52) U.S. Cl.
CPC .......... *H04L 63/061* (2013.01); *H04W 12/00* (2013.01); *H04L 2209/24* (2013.01)

(58) Field of Classification Search
USPC ........................................................ 713/171
See application file for complete search history.

(56) References Cited

U.S. PATENT DOCUMENTS

| | | | |
|---|---|---|---|
| 6,381,331 B1 | 4/2002 | Kato | |
| 6,975,730 B1* | 12/2005 | Kuroiwa | H04L 9/08 380/247 |
| 7,039,190 B1* | 5/2006 | Engwer | H04L 9/3271 380/247 |
| 7,325,136 B2* | 1/2008 | Alldredge | G06Q 20/02 380/283 |
| 8,775,794 B2* | 7/2014 | Benson | H04L 9/0844 380/28 |
| 9,716,591 B2* | 7/2017 | Lemke | H04L 9/321 |
| 9,767,299 B2* | 9/2017 | Selgas | G06F 21/6209 |
| 2004/0030891 A1* | 2/2004 | Kurihara | H04L 9/0822 713/168 |
| 2004/0122975 A1* | 6/2004 | Lennestal | H04L 63/065 709/245 |
| 2004/0172538 A1* | 9/2004 | Satoh | G06F 21/80 713/175 |
| 2005/0108523 A1* | 5/2005 | West | H04L 63/0428 713/165 |
| 2006/0236405 A1* | 10/2006 | Terauchi | H04L 63/06 726/27 |
| 2008/0086646 A1* | 4/2008 | Pizano | H04L 9/3231 713/189 |
| 2009/0138714 A1* | 5/2009 | Matsushita | H04L 9/083 713/171 |
| 2009/0235303 A1* | 9/2009 | Yamaoka | G06Q 30/02 725/31 |
| 2010/0169648 A1* | 7/2010 | Yoshida | H04L 63/0464 713/175 |
| 2011/0131138 A1* | 6/2011 | Tsuchiya | G06Q 20/354 705/71 |
| 2011/0235806 A1* | 9/2011 | Fukuda | H04L 9/0825 380/282 |
| 2012/0216041 A1* | 8/2012 | Naono | H04L 9/0822 713/171 |
| 2015/0113280 A1* | 4/2015 | Maruyama | H04L 9/0822 713/171 |
| 2015/0177284 A1* | 6/2015 | Fukuzawa | G01R 33/093 324/117 R |
| 2015/0326395 A1* | 11/2015 | Lemke | H04L 9/0827 713/155 |
| 2018/0048464 A1* | 2/2018 | Lim | H04L 9/08 |

FOREIGN PATENT DOCUMENTS

JP 2008028849 A 2/2008
WO WO 2000/068814 A1 11/2000

OTHER PUBLICATIONS

Japanese Examination Report for Application No. 2016510656.
David Chaum, "Untraceable Electronic Mail, Return Addresses, and Digital Pseudonyms", Communications of the ACM, Feb. 1981, vol. 24, No. 2.

* cited by examiner

METHOD PERFORMED BY AT LEAST ONE SERVER FOR PROCESSING A DATA PACKET FROM A FIRST COMPUTING DEVICE TO A SECOND COMPUTING DEVICE TO PERMIT END-TO-END ENCRYPTION COMMUNICATION

FIELD AND BACKGROUND

The present invention relates to a method performed by at least one server for processing a data packet from a first computing device to a second computing device to permit end-to-end encryption communication, and a corresponding system.

Presently, certain messaging solutions perform two different encryption-decryption methods, for example in a scenario where a server is arranged between two computing devices, a sender and a recipient, in a communication network. The sender encrypts a message using a symmetric key which is randomly generated. The sender then encrypts the symmetric key using the server's public key, and thereafter transmits a data package, comprising the encrypted message and symmetric key, to the server. The server decrypts the encrypted symmetric key using its own private key, after which the server then re-encrypts the symmetric key with the recipient's public key and the re-formatted data package is forwarded to the recipient. It will be appreciated that since the server has the symmetric key, the server is however then able to access the encrypted message. On receiving the data package, the recipient decrypts the encrypted symmetric key with its own private key to retrieve the symmetric key which is used to decrypt the encrypted message. For such a scenario, the server has a copy of the symmetric key and is able to decrypt the encrypted message for audit purposes or archival of the decrypted message. However, this is not considered true end-to-end encryption communication, since the server has access to the content of the message.

For other conventional implementations, the server may be configured to re-generate a new symmetric key and re-encrypt the message with the new symmetric key, and encrypt the new symmetric key with the recipient's public key. In this situation, the server nonetheless still has access to the encrypted message and thus also does not enable true end-to-end encryption communication.

One object of the present invention is therefore to address at least one of the problems of the prior art and/or to provide a choice that is useful in the art.

SUMMARY

According to a $1^{st}$ aspect of the invention, there is provided a method performed by at least one server for processing a data packet from a first computing device to be transmitted to a second computing device, wherein the data packet includes a message encrypted using a first encryption key to form an encrypted message, identification data of the second computing device encrypted using a second encryption key to form encrypted identification data, and encrypted first and second encryption keys. The method comprises decrypting the encrypted second encryption key; decrypting the encrypted identification data using the decrypted second encryption key; and transmitting the data packet based on the decrypted identification data. The encrypted message and first encryption key are arranged to be undecryptable by the server to permit end-to-end encryption communication between the first and second computing devices.

The method advantageously enables realisation of a multiple-key encryption scheme that allows a sender to send encrypted messages to a recipient(s) by forwarding the encrypted messages through an intermediate server to perform re-routing of the data packet, but the server is however not enabled with the ability to decrypt the encrypted messages. This beneficially ensures that a true end-to-end encryption is achieved between the sender and the recipient(s).

Preferably, decrypting the encrypted second encryption key may include using a private key of the server to perform the decryption. Also, transmitting the data packet may include transmitting via an SMS, an MMS, instant messaging, an email, an attachment or an electronic document delivery service. The message may include text, images, animation, video or audio. It is to be appreciated that the first encryption key may be encrypted using a public key of the second computing device, or alternatively, the first encryption key may be encrypted using a public key of the server. More preferably, the second encryption key may be encrypted using a public key of the server. Yet preferably, the data packet may further include an initialization vector, and a digital signature generated based on the encrypted message.

According to a $2^{nd}$ aspect of the invention, there is provided a method performed by a first computing device for processing information to be transmitted to a second computing device via at least one server to permit end-to-end encryption communication between the first and second computing devices. The method comprises encrypting a message and identification data of the second computing device respectively using first and second encryption keys; encrypting the first and second encryption keys; and transmitting the encrypted message, identification data, first and second encryption keys collectively as a data packet.

Preferably, the message may include text, images, animation, video or audio. Further, transmitting the data packet may include transmitting via an SMS, an MMS, instant messaging, an email, an attachment or an electronic document delivery service. More preferably, encrypting the first encryption key may include encrypting using an encryption key of the second computing device, or an encryption key of the server. In addition, the encryption key of the second computing device may include a public key thereof, and the encryption key of the server may include a public key thereof. Encrypting the second encryption key may include encrypting using an encryption key of the server. The encryption key of the server may include a public key thereof.

Preferably, the method may further comprise displaying an interface to enable a user of the first computing device to select the message from a plurality of messages, and the second computing device from a plurality of computing devices able to receive the data packet. The data packet may further include an initialization vector, and a digital signature generated based on the encrypted message.

According to a $3^{rd}$ aspect of the invention, there is provided a method performed by a first computing device for processing a data packet from a second computing device forwarded via at least one server to permit end-to-end encryption communication between the first and second computing devices, wherein the data packet includes a message encrypted using a first encryption key to form an encrypted message, identification data of the first computing device encrypted using a second encryption key to form encrypted identification data, and encrypted first and second encryption keys. The method comprises decrypting the encrypted first encryption key; and decrypting the encrypted message using the decrypted first encryption key to obtain the message.

Preferably, decrypting the encrypted first encryption key may include using a private key of the first computing device to perform the decryption.

According to a 4$^{th}$ aspect of the invention, there is provided a system for exchanging a data packet between first and second computing devices via at least one server to permit end-to-end encryption communication between the first and second computing devices. The system comprises the first and second computing devices, and the server. The first computing device includes an encryption module for: encrypting a message and identification data of the second computing device respectively using first and second encryption keys; and encrypting the first and second encryption keys; and a transmission module for transmitting the encrypted message, identification data, first and second encryption keys collectively as the data packet to the server. The server is configured to process the data packet received from the first computing device and includes a decryption module for: decrypting the encrypted second encryption key of the data packet; and decrypting the encrypted identification data of the data packet using the decrypted second encryption key; and a transmission module for transmitting the data packet to the second computing device based on the decrypted identification data, wherein the encrypted message and first encryption key are arranged to be undecryptable by the server. The second computing device is configured to process the data packet received from the server and includes a decryption module for: decrypting the encrypted first encryption key of the data packet; and decrypting the encrypted message of the data packet using the decrypted first encryption key to obtain the message.

Preferably, the decryption module of the server may include being configured to use a private key of the server to decrypt the encrypted second encryption key.

On the other hand, the transmission module of the server may include being configured to transmit the data packet using an SMS, an MMS, instant messaging, an email, an attachment or an electronic document delivery service. The message may include text, images, animation, video or audio. The encryption key of the second computing device used by the encryption module of the first computing device to encrypt the first encryption key may preferably include a public key of the second computing device.

Preferably, the encryption module, of the first computing device may further be configured to encrypt the first encryption key using an encryption key of the second computing device, or an encryption key of the server. In addition, the encryption module of the first computing device may yet further be configured to encrypt the second encryption key using an encryption key of the server.

Preferably, the encryption key of the server used by the encryption module of the first computing device to encrypt the second encryption key may include a public key of the server. The data packet may further include an initialization vector, and a digital signature generated based on the encrypted message.

According to a 5$^{th}$ aspect of the invention, there is provided an encryption device for processing information to be transmitted to a computing device via at least one server to permit end-to-end encryption communication between the encryption and computing devices. The encryption device comprises an encryption module for: encrypting a message and identification data of the computing device respectively using first and second encryption keys; and encrypting the first and second encryption keys; and a transmission module for transmitting the encrypted message, identification data, first and second encryption keys collectively as a data packet.

According to a 6$^{th}$ aspect of the invention, there is provided a decryption device for processing a data packet from a computing device forwarded via at least one server to permit end-to-end encryption communication between the decryption and computing devices, wherein the data packet includes a message encrypted using a first encryption key to form an encrypted message, identification data of the first computing device encrypted using a second encryption key to form encrypted identification data, and encrypted first and second encryption keys. The decryption device comprises a decryption module for: decrypting the encrypted first encryption key; and decrypting the encrypted message using the decrypted first encryption key to obtain the message.

According to a 7$^{th}$ aspect of the invention, there is provided a method performed by at least one server for processing a data packet from a first computing device to be transmitted to a second computing device, wherein the data packet includes a message encrypted using a first encryption key to form an encrypted message, identification data of the second computing device encrypted using a second encryption key to form encrypted identification data, an encrypted first encryption key formed by encrypting the first encryption key using a third encryption key associated with the second computing device, and an encrypted second encryption key formed by encrypting the second encryption key using an encryption key associated with the server. The method comprises decrypting the encrypted second encryption key; decrypting the encrypted identification data using the decrypted second encryption key; and transmitting the data packet based on the decrypted identification data. The encrypted first encryption key is arranged to be decryptable only using a fourth encryption key associated with the second computing device; and the third and fourth encryption keys of the second computing device are configured as a pair of asymmetric keys.

Preferably, the encryption key associated with the server may include a public key of the server. Following on, decrypting the encrypted second encryption key may include using a private key of the server to perform the decryption. Further, transmitting the data packet may include transmitting via an SMS, an MMS, instant messaging, an email, an attachment or an electronic document delivery service. The message may include text, images, animation, video or audio. Yet preferably, the third and fourth encryption keys respectively may include a public key and a private key of the second computing device. The data packet may further include an initialization vector, and a digital signature generated based on the encrypted message.

It should be apparent that features relating to one aspect of the invention may also be applicable to the other aspects of the invention.

These and other aspects of the invention will be apparent from and elucidated with reference to the embodiments described hereinafter.

BRIEF DESCRIPTION OF THE DRAWINGS

Embodiments of the invention are disclosed hereinafter with reference to the accompanying drawings, in which:

FIGS. 2a to 2c, shows the configurations of the first and second computing devices, and the server of FIG. 1;

DETAILED DESCRIPTION OF PREFERRED EMBODIMENTS

Figure 1:
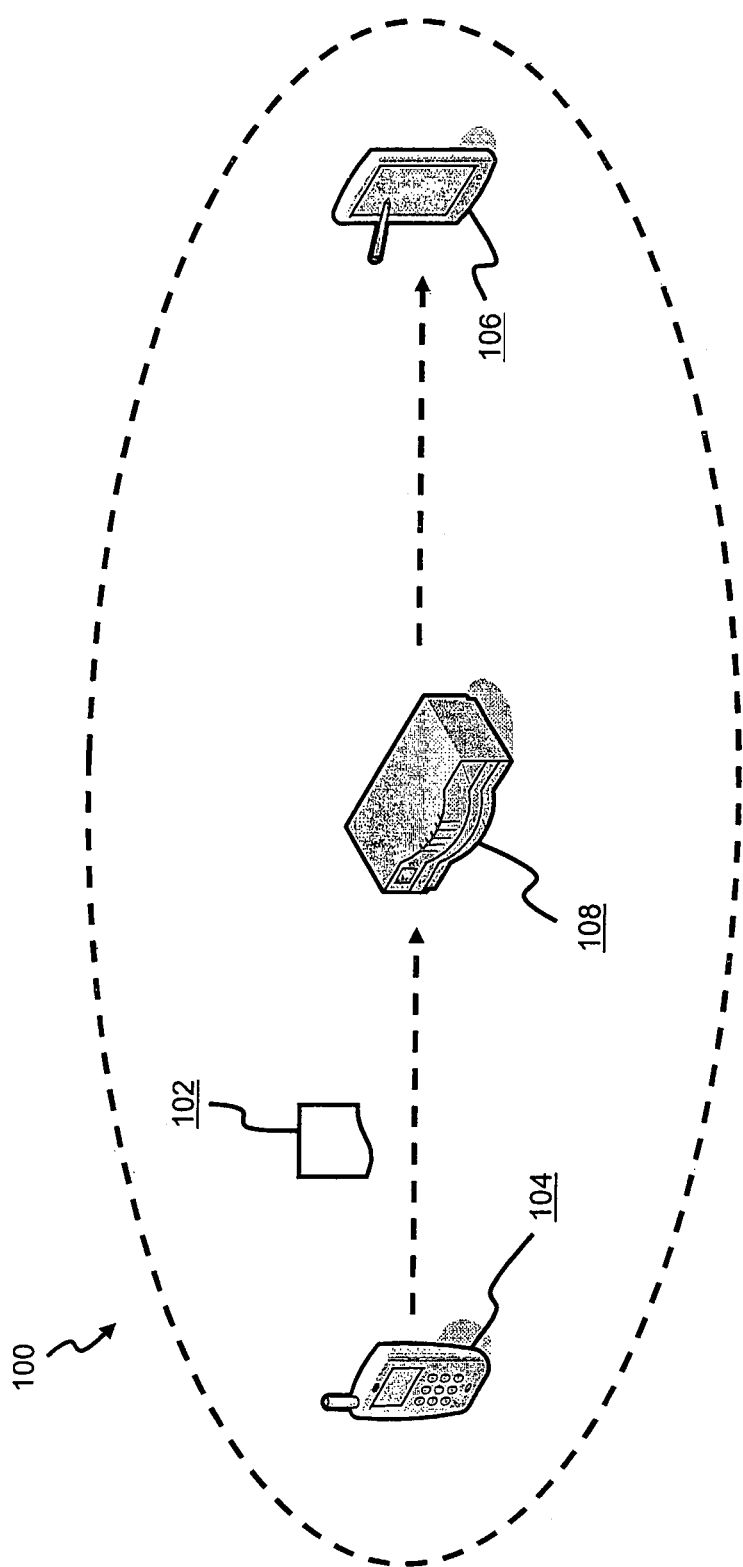
FIG. 1 is a schematic diagram depicting a system for exchanging a data packet between first and second computing devices via a server to permit end-to-end encryption communication, according to an embodiment of the present invention.

A system 100 (i.e. see FIG. 1) and corresponding method 500 (i.e. see FIG. 5) for exchanging a data packet 102 between first and second computing devices 104, 106 (i.e. two parties) via at least one server 108 to permit end-to-end encryption communication is disclosed, according to a first embodiment. The system 100 includes the first and second computing devices 104, 106, and the server 108, which is configurationally arranged intermediate to the first and second computing devices 104, 106. It is to be appreciated that the server 108 is configured with associated public key and private key, as per the public-key infrastructure (i.e. asymmetric keys cryptography) terminology. Similarly, the second computing device 106 is also configured with associated public key and private key. In the context of FIG. 1, the first computing device 104 is a sender of the data packet 102, and the second computing device 106 is an eventual intended recipient of the data packet 102. But it will also be appreciated that the opposite relationship is possible in other instances, i.e. the second computing device 106 becomes the sender, while the first computing device 104 becomes the recipient. In particular, the system 100 enables true end-to-end encryption communication between the sender and recipient, while still allowing the server 108 to route the data packet 102 in a secure manner, but without being able to decrypt a secure message embedded in the data packet 102 to access the contents of the message. Also for sake of simplicity in illustrating and describing, only one server 102 is shown in FIG. 1, although it will be understood that the data packet 102 may be forwarded through multiple servers 108 (i.e. a server cluster) before being received by the second computing device 106. In the said scenario of multiple servers 108, it is to be appreciated that each of the servers 108 is configured to have access to a common set of public key and private key (e.g. which may be stored locally on each server 108, or be stored on a storage server equally accessible by all the multiple servers 108). Specifically, the common set of public key and private key is to be used for the purpose of encrypting and decrypting identification data of the second computing device 106, which will be elaborated below. It is further to be appreciated that the first and second computing devices 104, 106, and the server 108 resides in a communication network.

Examples of the first and second computing devices 104, 106 include mobile computing devices (e.g. smartphones like iPhone™ or tablets like iPad™), wired computers (e.g. desktop personal computers) or the like. However, for the purpose of this embodiment, the first and second computing devices 104, 106 are mobile computing devices running on a predetermined suitable mobile operating system (e.g. iOS™ from Apple Inc™). For ease of referencing hereinafter, the first and second computing devices 104, 106 are respectively referred to as the encryption device 104 and the decryption device 106 (in the context of true end-to-end encryption communication relationship), unless otherwise explicitly stated. It will also be appreciated that there can be multiple encryption devices 104 and decryption devices 106 arranged within the system 100 in the communication network to exchange different data packets 102 with one another, but not however specifically shown in FIG. 1 in this instance, for sake of brevity. As for the server 108, examples include any types of server suitably configured for performing the task of routing the data packet 102 between the encryption device 104 and decryption device 106.

Figure 2:
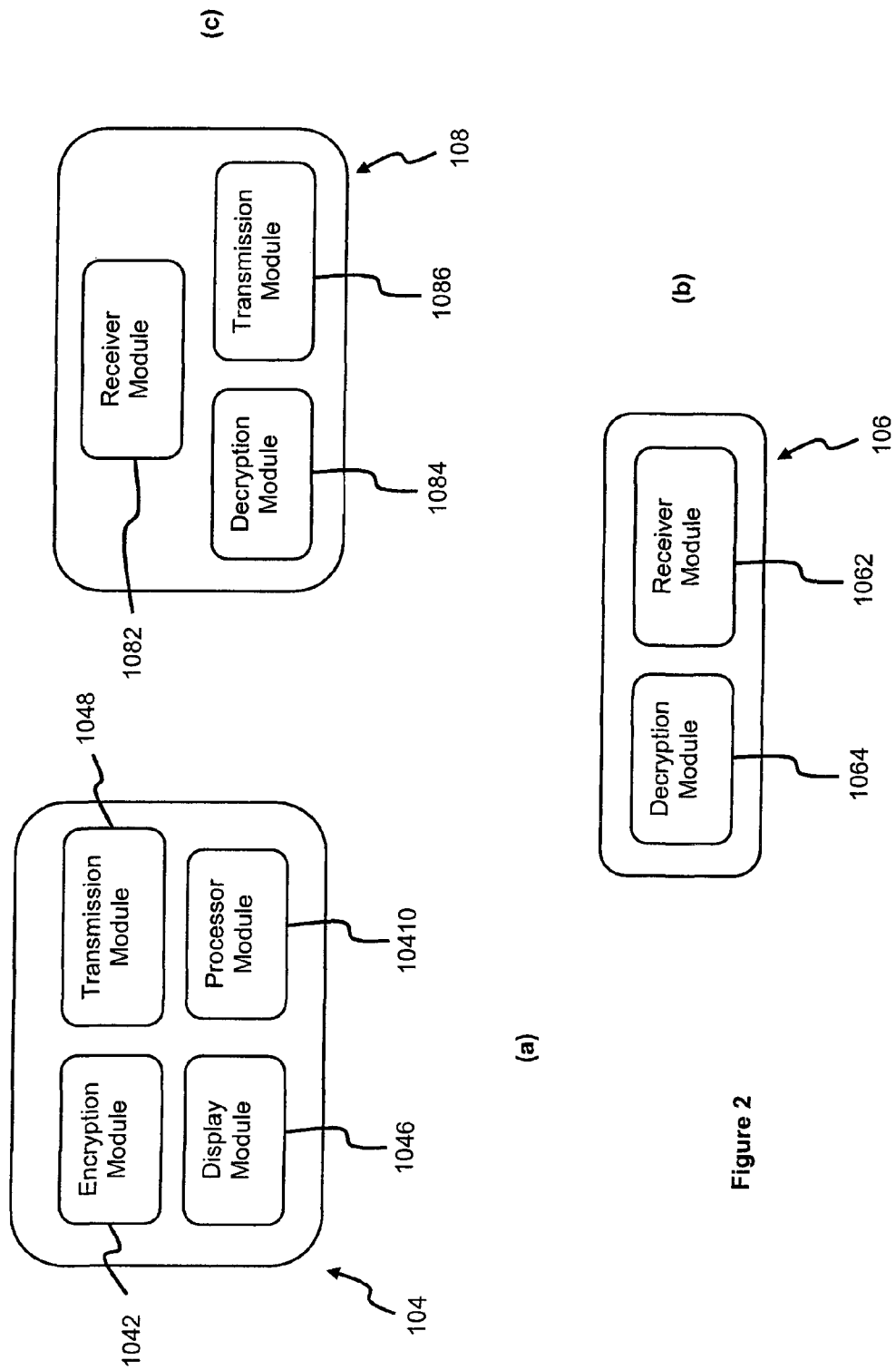
FIG. 2, includes

Referring to FIG. 2, the encryption device 104 is configured to execute an encryption program code (not shown) for processing information into the data packet 102 to be provided to the decryption device 106, whereas the decryption device 106 is configured to execute a decryption program code (not shown) for processing the received data packet 102. On the other hand, the server 108 is configured to execute a data-packet processing code (not shown), which is based on the method 500 of FIG. 5, for processing the data packet 102 sent by the encryption device 104 to the decryption device 106. It will be appreciated that, in this embodiment, the encryption and decryption program codes are locally installed on the encryption device and decryption device 104, 106, and further, the encryption and decryption program codes are realised as native mobile applications (e.g. as a software usable by users). Specifically, the encryption device 104 includes the following modules: an encryption module 1042, a display module 1046, a transmission module 1048 and a processor module 10410, while the decryption device 106 includes the following modules: a receiver module 1062, and a decryption module 1064. Similarly, the data-packet processing code is implemented as an application specific program (which may be configured to run as a background process) and locally installed on the server 108. For the server 108, the following modules are arranged therewithin: a receiver module 1082, a decryption module 1084, and a transmission module 1086. In this instance, it is to be understood that the respective said modules of the encryption device 204 and decryption device 206 are implemented in software, and thus are incorporated respectively into the encryption program code and decryption program code. This applies mutatis mutandis to the said modules of the server 108.

Figure 3:
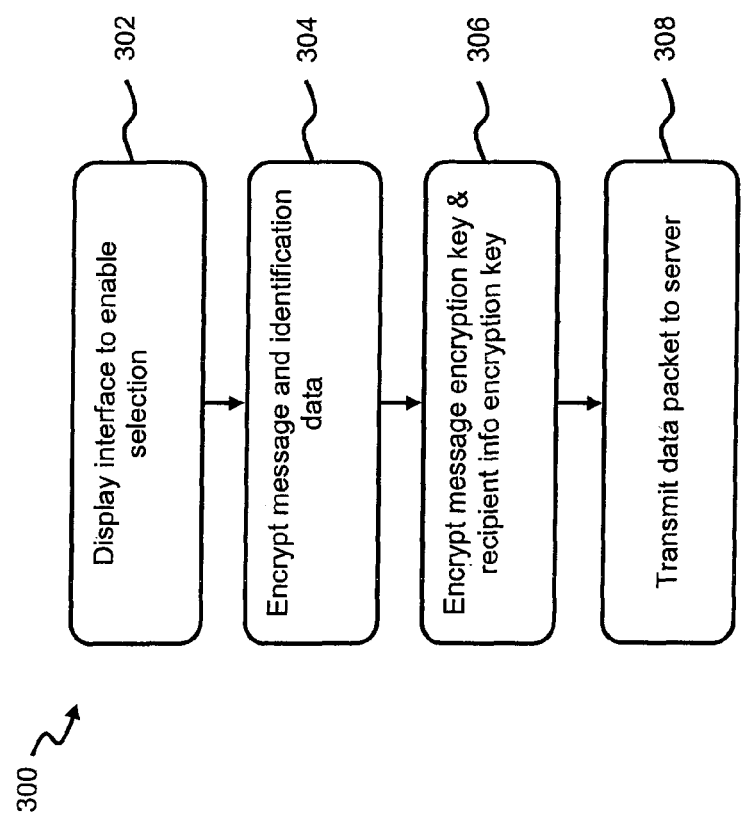
FIG. 3 is a flow diagram of a method performed by the first computing device of FIG. 1 for processing information to be transmitted to the second computing device as the data packet.
Figure 4:
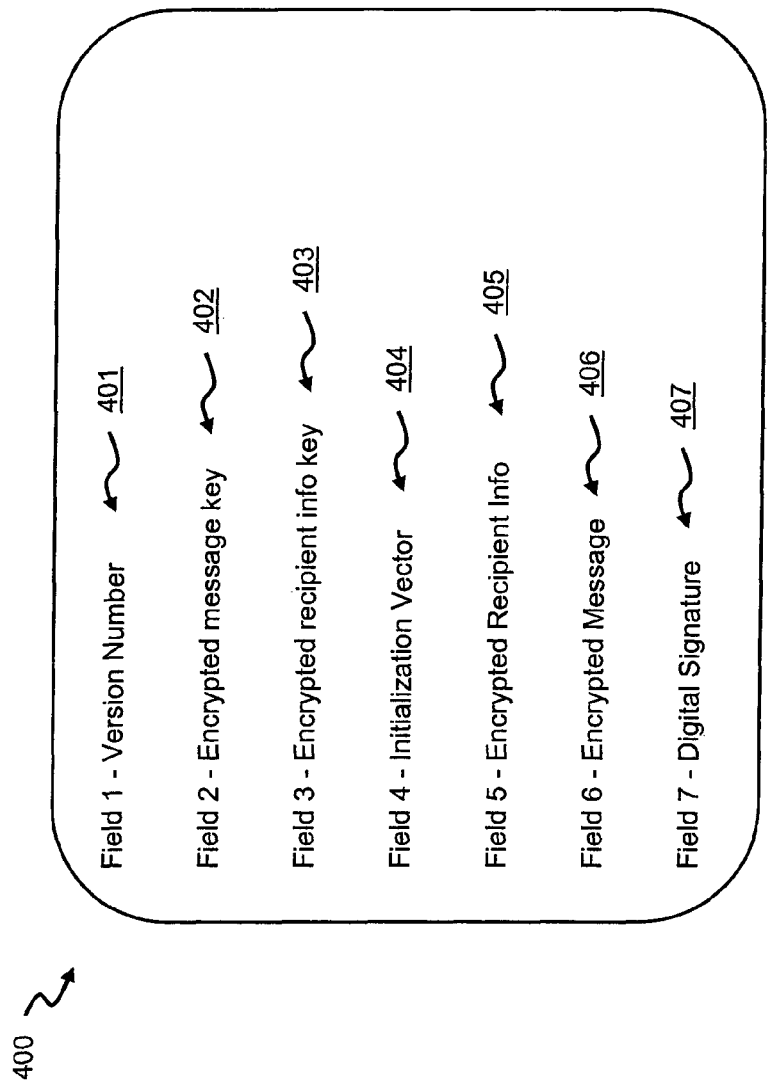
FIG. 4 shows a format of the data packet.

Reference is now made to FIGS. 3 and 4 to describe a method 300 performed by the encryption device 104 (i.e. the sender) for processing information to be transmitted to the decryption device 106 (i.e. the recipient) via the server 108 to permit end-to-end encryption communication. At step 302 of the method 300, the display module 1046 is arranged to display a software interface (not shown) to enable a user (not shown) of the encryption device 104 to select a desired message (i.e. input data) from a plurality of messages to be sent to the decryption device 106. It will be appreciated that the message includes text, images, animation, video, audio or the like. In addition, at the step 302, the user also uses the software interface to select a recipient (from a plurality of devices) of the selected message, which in this context is the decryption device 106. Further, the interface also displays an option on whether end-to-end encryption is desired by the user. If the user selects the end-to-end encryption option, the encryption device 104 proceeds to prepare the data packet 102, to embed the selected message, based on a secure packet format 400 as shown in FIG. 4. Also, to proceed with the end-to-end encryption communication, the encryption device 104 is configured to then randomly generate a symmetric message encryption key (not shown) and a recipient info encryption key (not shown), the purposes of which are elaborated below. In addition, a new unique set of message encryption key and recipient info encryption key is generated for each data packet 102 to be transmitted by the encryption device 104. It is further to be appreciated that the data packet 102 may be embedded as a payload of a standard IP packet.

Referring to FIG. 4, the packet format 400 includes seven data fields 401-407 in total, although additional necessary data fields may be added if required. Specifically, the seven data fields 401-407 include (based on an arranged order of data sequence in the packet format 400): a version-number field 401, an encrypted-message-key field 402, an encrypted-recipient-information-key field 403, an initialization-vector field 404, an encrypted-recipient-information field 405, an encrypted-message field 406, and a digital-signature 407 field. To briefly explain, the version-number field 401 defines a present version of the packet format 400 in use, the encrypted-message-key field 402 stores the message encryption key encrypted using the public key of the decryption device 106, while the encrypted-recipient-information-key field 403 stores the recipient info encryption key encrypted using the public key of the server 108. For a scenario comprising multiple servers 108, the encrypted-recipient-information-key field 403 stores the recipient info encryption key which is encrypted instead using the common public key accessible by all the servers 108, as afore explained. The initialization-vector field 404 defines a starting variable used for encryption (as will be appreciated by skilled persons), the encrypted-recipient-information field 405 stores identification data of the decryption device 106 encrypted using the recipient info encryption key, whereas the encrypted-message field 406 stores the selected message encrypted using the message encryption key, and the digital-signature field 407 stores an authentication checksum generated based on the encrypted message (as stored in the encrypted-message field 406). It is to be appreciated that the identification data of the decryption device 106 refers to associated location information, such as an IP address, of the decryption device 106, which would enable the server 108 to identify, forward and route the data packet 102 from the encryption device 104 to the decryption device 106. Thus, the identification data is location information associated with the recipient, since the decryption device 106 is the recipient of the data packet 102 in this instance. It is to be appreciated that the encryption device 104 obtains the identification data of the decryption device 106, as distributed by the server 108 through a separate communication channel/means, which is not the focus of the discussion of the present invention.

It is to be appreciated that the software interface, displayed by the display module 1046 of the encryption device 104, automatically separates the identification data from the message (without requiring any user intervention), for the purpose of enabling the identification data to be encrypted separately from the message (which will also be encrypted). This is now elaborated below.

Resuming our description of the method 300 in FIG. 3, at step 304, the encryption module 1042 (of the encryption device 104) encrypts the selected message and identification data of the decryption device 106 respectively using the message encryption key and the recipient info encryption key, and stores the encrypted message and identification data respectively in the encrypted-message field 406 and encrypted-recipient-information field 405 (of the data packet 102). A corresponding authentication checksum is also generated by the processor module 10410 (of the encryption device 104) based on the encrypted message (using any suitable existing checksum algorithms), and stored in the digital-signature field 407. Thereafter at step 306, the encryption module 1042 (of the encryption device 104) encrypts the message encryption key and the recipient info encryption key using respectively the public key of the decryption device 106, and the public key of the server 108. It is to be appreciated that for a scenario which comprises multiple servers 108, the recipient info encryption key is instead encrypted using the common public key accessible by all the servers 108, as above explained. The encrypted message encryption key, and recipient info encryption key are then respectively stored in the encrypted-message-key field 402 and encrypted-recipient-information-key field 403 (of the data packet 102). The data packet 102 is then assembled into a complete form by the encryption device 104. At step 308, the transmission module 1048 (of the encryption device 104) transmits the (assembled) data packet 102 to the server 108. It is to be appreciated that the data packet may be transmitted via suitable digital messaging schemes such as using an SMS, an MMS, instant messaging (IM), an email, an attachment, an electronic document delivery service or the like.

Figure 5:
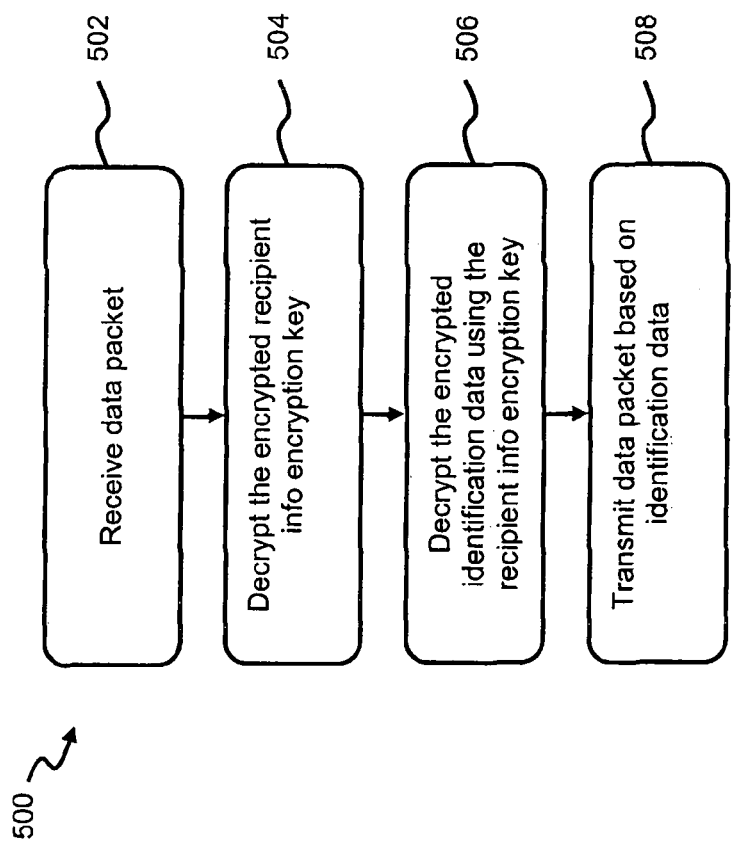
FIG. 5 is a flow diagram of a method performed by the server of FIG. 1 for processing the data packet received from the first computing device.

The server 108 then performs a method 500 (as depicted in FIG. 5) for processing the data packet 102 that is received from the encryption device 104, which permits true end-to-end encryption communication between the encryption device 104 and decryption device 106. In particular, the server 108 first receives the data packet 102 via the receiver module 1082 (of the server 108) at step 502. The server 108 performs an authentication check using data retrieved from the digital-signature field 407 of the received data packet 102 to ensure that the encrypted message in the encrypted-message field 406 has not been tampered with at any point during transit from the encryption device 104 to the server 108. Then, at step 504, the decryption module 1084 of the server 108 is configured to decrypt the encrypted recipient info encryption key, as stored in the encrypted-recipient-information-key field 403 of the received data packet 102, using the private key of the server 108. This allows retrieval of the recipient info encryption key "in the clear" (i.e. unencrypted). It is to be appreciated that for a scenario which comprises multiple servers 108, the encrypted recipient info encryption key is instead decrypted using the common private key which is accessible by all the servers 108, as already above explained. Thereafter, the decryption module 1084 of the server 108 proceeds to decrypt the encrypted identification data, as stored in the encrypted-recipient-information field 405 of the data packet 102, using the recipient info encryption key obtained in step 504. This allows retrieval of the identification data "in the clear". Once the server 108 determines where the data packet 102 needs to be routed to next, based on the identification data obtained in afore said step 506, the transmission module 1086 of the server 108 then transmits and forwards the data packet 102 to the destination specified in the identification data. Of course, in the context of the current discussion, the identification data is associated with the decryption device 106, and thus the data packet is to be forwarded to the decryption device 106. Importantly, it is to be appreciated that the data packet 102 is forwarded by the server 108 verbatim to the decryption device 106; that is, the server 108 does not (in anyway) alter, re-encrypt or re-format the data packet 102 which it receives from the encryption device 104.

It is to be understood that during the performance of the method 500 of FIG. 5, the server 108 will not be able to decrypt the encrypted-message field 406 and the encrypted-message-key field 402 of the data packet 102. This is because the server 108 is not configured to have a copy of the private key of the decryption device 106, which is required in order to decrypt the encrypted-message-key field 402. Only with retrieval of the message encryption key "in the clear" would enable the encrypted-message field 406 to be decrypted to obtain the message "in the clear". That is, the server 108 is unable to decrypt and access the message intended for the decryption device 106, which beneficially permits secure end-to-end encryption communication between the sender and intended recipient.

Figure 6:
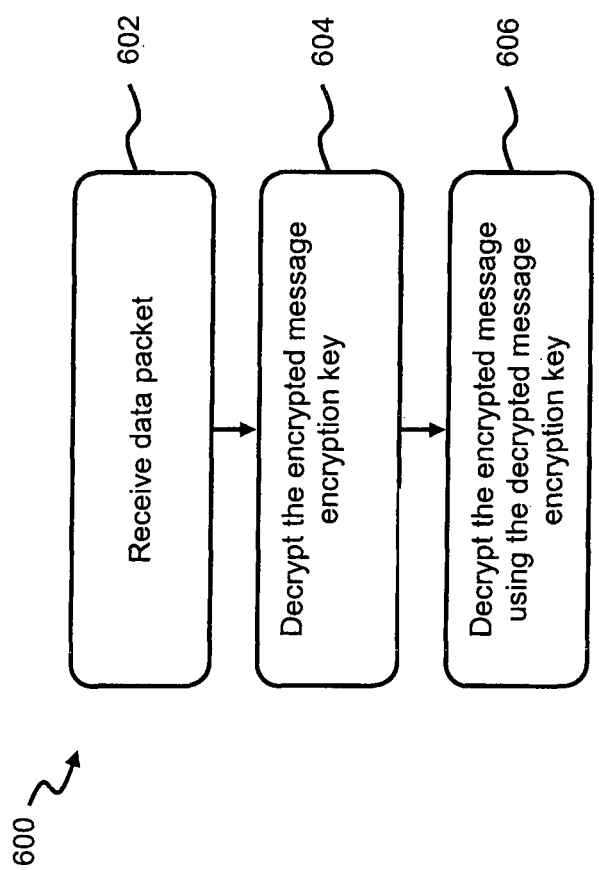
FIG. 6 is a flow diagram of a method performed by the second computing device of FIG. 1 for processing the data packet received from the server.

FIG. 6 then depicts a method 600 performed by the decryption device 106 for processing the data packet 102 received from the server 108. At step 602, the receiver module 1062 (of the decryption device 106) receives the data packet 102 forwarded by the server 108, and at step 604, the decryption module 1064 (of the decryption device 106) is configured to decrypt the encrypted-message-key field 402 of the data packet 102 to obtain the message encryption key "in the clear". With successful retrieval of the decrypted message encryption key, the decryption module 1064 (of the decryption device 106) is then arranged to use the message encryption key (obtained at step 604) to decrypt the encrypted-message field 406 of the data packet 102 to obtain the decrypted message at step 606. The decryption device 106 may then access and read the message that was transmitted by the encryption device 104.

Further embodiments of the invention will be described hereinafter. For the sake of brevity, description of like elements, functionalities and operations that are common between the embodiments are not repeated; reference will instead be made to similar parts of the relevant embodiment(s).

According to a second embodiment, in a scenario where there are multiple decryption devices 106 (i.e. more than one recipients for group communications), the encryption module 1042 (of the encryption device 104) encrypts the identification data of each decryption device 106 using the recipient info encryption key associated with the corresponding decryption device 106, thereafter stores all of the encrypted identification data into the encrypted-recipient-information field 405 of a new data packet 102 to be transmitted. In particular, all of the encrypted identification data are concatenated into a data string which is stored into the encrypted-recipient-information field 405 of the new data packet 102. All the recipient info encryption keys of the multiple decryption devices 106 are then arranged to be encrypted (by the encryption module 1042 of the encryption device 104) using the public key of the server 108, and collectively stored in the encrypted-recipient-information-key field 403 of the data packet 102. Furthermore, the encryption module 1042 (of the encryption device 104) also uses the public key of each decryption device 106 to encrypt the message encryption key, which is then stored into the encrypted-message-key field 402 of the data packet 102. More specifically, the message encryption key is independently and singly encrypted using the corresponding public key of each decryption device 106 to form an associated encrypted message encryption key. As will be appreciated, this process is performed for the public keys of all the decryption devices 106, and the resulting encrypted message encryption keys generated are then subsequently concatenated into a data string, that is stored into the encrypted-message-key field 402 of the data packet 102. It is to be appreciated that in this embodiment, the steps 302-308 in the method 300 of FIG. 3 are still performed similarly by the encryption device 104; only the type and amount of data stored in the data packet 102 varies in respect of the first embodiment.

When the server 108 receives the data packet 102 transmitted by the encryption device 104, the decryption module 1084 of the server 108 then decrypts the encrypted recipient info encryption key, as stored in the encrypted-recipient-information-key field 403 of the received data packet 102, using the private key of the server 108. This enables the server 108 to retrieve all the decrypted recipient info encryption keys of the multiple decryption devices 106, which are then further respectively used to decrypt the corresponding segment of the data string as stored in the encrypted-recipient-information field 405 of the data packet 102 to obtain the decrypted identification data of all the multiple decryption devices 106. With the decrypted identification data, the server 108 is then able to re-route the data packet 102 to each of the intended decryption devices 106. When the data packet 102 is delivered to each of the decryption devices 106, the respective decryption devices 106 then decrypts the corresponding encrypted message encryption keys (stored in the data string in the encrypted-message-key field 402 of the received data packet 102) using the associated private keys of the respective decryption devices 106 to obtain a copy of the message encryption key. With the message encryption key, each decryption device 106 is able to decrypt the encrypted-message field 406 of the data packet 102 to obtain the decrypted message. It is to be appreciated that in this embodiment, the steps 502-508 in the method 500 of FIG. 5 are still performed similarly by the server 108. It is also further to be appreciated that the server 108 does not need to re-encrypt the message, and neither is the server 108 able to re-encrypt the message, for reasons already stated in the first embodiment and thus not repeated for brevity.

According to a third embodiment, in a slight variation to the first embodiment, instead of the public key of the decryption device 106, the public key of the server 108 is now used to encrypt the message encryption key at step 306 in the method 300 of FIG. 3 (as selected by the user of the encryption device 104). This means that the server 108 is then able to access the encrypted message, because the server 108 can subsequently decrypt the encrypted message encryption key using the private key of the server 108. Indeed, with retrieval of the message encryption key, the server 108 can thus decrypt the encrypted message to access it. That is, this means that the user of the encryption device 104 may also want the server 108 to be granted access to the contents of the encrypted message (e.g. for security verification purposes). Other than the above said variation, it will be appreciated that the remaining of the described details of the first embodiment apply to the third embodiment, with no other changes.

In summary, the proposed system 100 (and corresponding method) enables realisation and implementation of a multiple-key encryption scheme that allows a sender to send encrypted messages to one or multiple recipients by forwarding the encrypted messages through at least one (intermediate) server to perform the re-routing, but however does not permit the server to have the ability to decrypt the encrypted messages. This advantageously ensures that a true end-to-end encryption is maintained and achieved between the sender and the recipient(s), without allowing the server to actually decrypt the encrypted messages.

Also, the proposed system 100 is configured to allow the sender to make a determination on whether the sender wants the server to be able to access an encrypted message. If the sender wants the server to access the said encrypted message, the sender can select an option whereby the public key of the server may instead be used to encrypt the message encryption key (i.e. the third embodiment). But, if the sender instead wants a true end-to-end encryption, in which the server is unable to decrypt the encrypted message, then the first and second embodiments apply.

To reiterate, the proposed system 100 and method enable true end-to-end encryption communication between the sender and multiple recipients through the (at least one) server, in which the server is configured to route (and archive) data packets arranged with customized secure packet format having, multiple encryption fields. One of the encryption fields stores an encrypted message intended for the recipient by the sender, and the server is not able to decrypt and access the encrypted message (which is encrypted using a public key of the recipient). Specifically, the secure packet format defines information required by different parties, either for the purpose of archival, re-routing or the actual intended recipient(s). The identification data of the recipient is encrypted to prevent unauthorized access to the recipient's identification information. Particularly, the data packet is encrypted using a proposed multiple-key encryption scheme using a customized encryption software application, and is transmitted to the recipient(s) via a digital messaging platform and is received by the recipient(s) on the same type of digital messaging platform. To access the message, the recipient then decrypts the encrypted message (using the recipient's own private key) to view the message. It will be appreciated that the server receives the same data packet in the process of forwarding the data packet to the recipient, and is able to decrypt specific encryption fields of the data packet, i.e. the encrypted-recipient-information field 405 of the data packet to determine whether to re-route the data packet or to archive the data packet. However, the server is not configured with an encryption key (i.e. private key of the recipient) for decrypting the encrypted message stored in the data packet. This ensures that in a digital messaging system, where the (intermediate forwarding) server performs a critical role for routing messages between senders and recipients, the server is not able to decrypt the encrypted message and access the associated content. Hence, the proposed system enables a true end-to-end encryption system and scheme for the sender and recipients, but yet allows the server to participate in the forwarding/routing communications without compromising the security and authenticity of the content of the encrypted message transmitted by the sender to the recipient.

To also broadly summarise the proposed method, there is disclosed a method performed by at least one server for processing a data packet from a first computing device to be transmitted to a second computing device, wherein the data packet includes a message encrypted using a first encryption key to form an encrypted message, identification data of the second computing device encrypted using a second encryption key to form encrypted identification data, an encrypted first encryption key formed by encrypting the first encryption key using a third encryption key associated with the second computing device, and an encrypted second encryption key formed by encrypting the second encryption key using an encryption key associated with the server. The method comprises decrypting the encrypted second encryption key; decrypting the encrypted identification data using the decrypted second encryption key; and transmitting the data packet based on the decrypted identification data. Specifically, the encrypted first encryption key is arranged to be decryptable only using a fourth encryption key associated with the second computing device, wherein the third and fourth encryption keys of the second computing device are configured as a pair of asymmetric keys. That is, the pair of asymmetric keys comprises a public key (i.e. the third encryption key) and a private key (i.e. the fourth encryption key) as per the established concept of public-key cryptography.

The described embodiments should not however be construed as limitative. For example, it is to be appreciated that the encryption and decryption devices 104, 106 may be any other types of suitable devices besides mobile computing devices. Also, the respective modules of the encryption device 104 and decryption device 106 (if implemented in software) may be programmatically integrated and provided as respective single, complete software applications that are installable on and executable by similar computing devices that may be envisaged for processing the data packet 102. Optionally, the single complete software applications may be implemented in entirety in hardware, and a copy of such an implemented hardware is incorporated on each of the encryption device 104 and the decryption device 106. The alternative configurations described in the immediate preceding two statements may also apply mutatis mutandis to the said modules of the server 108. Moreover, alternatively, the encryption and decryption program codes may be stored on external storage devices, and are downloadable "on-demand" to be executed on the encryption device and decryption device 104, 106 respectively when required. Further, in the software interface, as displayed by the display module 1046 of the encryption device 104, an option to allow the user to select the server 108 as the recipient, instead of the decryption device 106, may also be displayed. It is also to be appreciated that for a scenario of multiple servers 108, the servers 18 may be collectively configured with a set of load balancing rules which determine where the data packet 102 is to be forwarded to. Further, the packet format 400 as shown in FIG. 4 may be modified as necessary to include new data fields, or remove existing data fields, based on requirements of an intended application.

While the invention has been illustrated and described in detail in the drawings and foregoing description, such illustration and description are to be considered illustrative or exemplary, and not restrictive; the invention is not limited to the disclosed embodiments. Other variations to the disclosed embodiments can be understood and effected by those skilled in the art in practising the claimed invention.

The invention claimed is:

1. A method performed by at least one server for processing a data packet from a first computing device to be transmitted to a second computing device, the method comprising:

receiving a data packet from the first computing device, the data packet including a message encrypted using a first encryption key to form an encrypted message, identification data of the second computing device encrypted using a second encryption key to form encrypted identification data, an encrypted first encryption key formed by encrypting the first encryption key using a third encryption key associated with the second computing device, an encrypted second encryption key formed by encrypting the second encryption key using a public key of the server, and a digital signature in the form of an authentication checksum generated based on the encrypted message;

authenticating the authentication checksum by the server;

decrypting the encrypted second encryption key by the server using a private key of the server;

decrypting the encrypted identification data using the decrypted second encryption key by the server; and transmitting the data packet to the second computing device based on the decrypted identification data by the server, wherein the encrypted message and first encryption key are arranged to be undecryptable by the server to permit end-to-end encryption communication between the first and second computing devices, wherein the encrypted first encryption key is arranged to be decryptable only using a fourth encryption key associated with the second computing device; and wherein the third and fourth encryption keys are respectively a public key and a private key of the second computing device.

2. The method of claim 1, wherein the data packet further includes an initialization vector.

3. The method of claim 1, wherein the authenticating the authentication checksum is performed to ensure that the encrypted message has not been tampered with during transmission of the data packet, and that the data packet is transmitted by the first computing device.

4. A method performed by a first computing device for processing information to be transmitted to a second computing device via at least one server to permit end-to-end encryption communication between the first and second computing devices, the method comprising:

receiving a data packet from the first computing device;

encrypting a message and identification data of the second computing device respectively using first and second encryption keys;

encrypting the first encryption key using a public key of the second computing device;

encrypting the second encryption key using a public key of the server;

generating a digital signature in the form of an authentication checksum; and transmitting the encrypted message, the encrypted identification data, the encrypted first and the encrypted second encryption keys, and digital signature collectively as a data packet.

5. The method of claim 4, further comprising displaying an interface to enable a user of the first computing device to select the message from a plurality of messages, and the second computing device from a plurality of computing devices able to receive the data packet.

6. The method of claim 4, wherein the data packet further includes an initialization vector.

7. The method of claim 4, wherein the authentication checksum is authenticated by the server to ensure that the encrypted message has not been tampered with during transmission of the data packet, and that the data packet is transmitted by the first computing device.

8. A system for exchanging a data packet between first and second computing devices via at least one server to permit end-to-end encryption communication between the first and second computing devices, the system comprising:

the first computing device which includes
an encryption module for:
encrypting a message and identification data of the second computing device respectively using first and second encryption keys;
encrypting the first and second encryption keys; and,
generating a digital signature in the form of an authentication checksum; and
a transmission module for transmitting the encrypted message, identification data, first and second encryption keys collectively as the data packet to the server
wherein the encrypted first encryption key is formed by encrypting the first encryption key using a third encryption key associated with the second computing device, and the encrypted second encryption key is formed by encrypting the second encryption key using a public key of the server;

the server configured to process the data packet received from the first computing device and includes
a decryption module for:
authenticating the authentication checksum;
decrypting the encrypted second encryption key of the data packet using a private key of the server; and
decrypting the encrypted identification data of the data packet using the decrypted second encryption key; and
a transmission module for transmitting the data packet to the second computing device based on the decrypted identification data, wherein the encrypted message and first encryption key are arranged to be undecryptable by the server; and the second computing device configured to process the data packet received from the server and includes
a decryption module for:
decrypting the encrypted first encryption key of the data packet; and
decrypting the encrypted message of the data packet using the decrypted first encryption key to obtain the message, wherein the encrypted first encryption key is arranged to be decryptable only using a fourth encryption key associated with the second computing device; and wherein the third and fourth encryption keys are respectively a public key and a private key of the second computing device.

9. The system of claim 8, wherein the authenticating the authentication checksum is performed to ensure that the encrypted message has not been tampered with during transmission of the data packet, and that the data packet is transmitted by the first computing device.

* * * * *